(12) United States Patent
Miller et al.

(10) Patent No.: US 7,223,002 B2
(45) Date of Patent: May 29, 2007

(54) HYBRID FIBER OPTIC FRAMING PROJECTOR

(76) Inventors: Jack V. Miller, 20915 Sussex Hwy., Seaford, DE (US) 19973; Ruth Ellen Miller, 20915 Sussex Hwy., Seaford, DE (US) 19973

(*) Notice: Subject to any disclaimer, the term of this patent is extended or adjusted under 35 U.S.C. 154(b) by 152 days.

(21) Appl. No.: 10/915,664

(22) Filed: Aug. 9, 2004

(65) Prior Publication Data

US 2006/0028834 A1 Feb. 9, 2006

(51) Int. Cl.
*F21V 7/04* (2006.01)

(52) U.S. Cl. ............... 362/551; 362/555; 362/560; 362/580; 362/582

(58) Field of Classification Search ......... 362/551, 362/560, 580, 582; 359/618, 626–628, 709–710, 359/641; 353/115
See application file for complete search history.

(56) References Cited

U.S. PATENT DOCUMENTS

| | | | |
|---|---|---|---|
| 3,576,563 A * | 4/1971 | Scott et al. ............. | 385/115 |
| 4,839,783 A | 6/1989 | Arai | |
| 5,099,399 A | 3/1992 | Miller et al. | |
| 5,907,648 A * | 5/1999 | Miller et al. ............. | 385/33 |
| 5,921,670 A * | 7/1999 | Schumacher et al. ...... | 362/480 |
| 6,000,808 A * | 12/1999 | Hansen ................. | 362/109 |
| 7,004,588 B2 * | 2/2006 | Sadler ................. | 353/28 |
| 2005/0237764 A1 * | 10/2005 | Jain ................... | 362/551 |

OTHER PUBLICATIONS

Handbook of the I.E.S.N.A. (Illuminating Engineering Society of North America) pp. 587, 586 and 166.

* cited by examiner

*Primary Examiner*—Sandra O'Shea
*Assistant Examiner*—Anabel Ton

(57) ABSTRACT

This invention provides a hybrid fiber optic framing projector of high optical efficiency that emits no UV (ultraviolet) or IR (infrared) energy in the projected beam. A preferred embodiment includes a light source on an optical axis at the primary focus of an ellipsoidal cold mirror reflector. The ellipsoidal reflector focuses visible light from the light source to a conjugate focus through a dichroic hot mirror and then into a heat-absorbing, UV-absorbing glass rod. The glass rod transmits light by total internal reflection as an optical fiber from the conjugate focus to the focal plane of a collimating lens. A confocal reflector has a spherical radius about the light source, that radius being equal to the distance from the primary focus to the conjugate focus. The proximal end of the glass rod is positioned on the optical axis in a hole through the confocal reflector at the conjugate focus, whereby light rays from the light source that fall outside the glass rod in are reflected by the spherical confocal reflector back to the light source to be re-reflected or re-radiated as additional light focussed back to the conjugate focus, through the glass rod and to a collimating lens. The foregoing optical components are enclosed in a housing having heat flow paths from the optical elements to the housing exterior.

16 Claims, 9 Drawing Sheets

HYBRID FIBER OPTIC FRAMING PROJECTOR

BACKGROUND OF THE INVENTION

This invention relates to the field of luminaires (light fixtures) comprising a hybrid combination of fiber optic components for removing ultraviolet and infrared energy from projected light, and variable-beam framing projector components for projecting light beams in variable widths, shapes or colors.

DESCRIPTION OF FIBER OPTIC PRIOR ART

A fiber optic lighting system has the unique ability to project light from a single light source, through the proximal end of an elongated fiber optic light guide to one or more distal end luminaires. One primary advantage of a properly-designed fiber optic lighting system is the total elimination of UV (ultraviolet) and IR (infrared) energy from the emitted light spectrum. Reference is made to the applicants' U.S. Pat. No. 5,099,399 and the applicants' co-pending application entitled: *High Efficiency Fiber Optic Lighting* System, filed Jul. 21, 2004.

Fiber optic lighting systems employ light sources such as tungsten-halogen or metal halide lamps that emit intense light including far more UV (ultraviolet} and IR (infrared heat) energy than visible illumination. Most fiber optic projectors irradiate the proximal end of a light guide with UV and IR so intensely that the light guides have short service lives and are warranted for only a year. They also require a "service loop" of extra light guide length that periodically becomes "caramelized" (aged, melted or burned). Then the caramelized end is cut off, and a "fresh" proximal end of the light guide is inserted into the projector.

However, at the time of this application one fiber optic projector actually produces no UV and no IR to damage optical fibers. That projector, which does not caramelize fiber ends, is described in the applicants' U.S. Pat. No. 5,099,399. The '399 patent teaches placing a IR heat and UV absorbing glass rod between a focussed light source and the proximal end of a fiber optic light guide. The elongated glass rod longitudinally conducts and transversely dissipates the IR from the light. Such systems meet the requirement for "No UV and No IR" in museum, retail merchandise and even food lighting, as published in the 9th edition of the Lighting Handbook of the I.E.S.N.A. (Illuminating Engineering Society of North America) pages 14-4, 17-8 and 17-9.

Another chronic problem with many prior art fiber optic projectors is uneven light distribution across the proximal end of the light guide. Therefore in typical systems having many distal ends or "tails", the tails will have unequal brightness.

This problem has also been solved with fiber optic projectors following the applicants' '399 patent, as the elongated glass rod (in addition to providing UV and IR control) homogenizes the light into a smooth, uniform pattern that equally illuminates every part of the proximal end of the light guide. Thus all fiber in the guide are equally bright.

DESCRIPTION OF FRAMING PROJECTOR PRIOR ART

A framing projector has the unique ability to project an image of a light source through a lens with virtually no spill light. A framing projector can also project a narrow beam having variable beam size, shape and even color. Some framing projectors change beam size by changing the size of an aperture that masks the source size to smaller or larger dimensions, and others use a variable focal length zoom lens that is movable along the optical axis of the light source to expand or contract the beam.

Prior art framing projectors are often used in display and theatrical lighting. The primary goal of a framing projector is to focus light at an aperture that can be varied in shape, size and even color. Thus the aperture becomes a bright image at the focus of a collimating lens that can project a beam of light having nearly any desired properties. Several different apertures are normally incorporated into a movable plate at the focal plane of the collimating lens, as shown in prior art U.S. Pat. No. 4,839,783. The collimating lens then projects an image of the aperture as a light beam. Thus framing projectors are truly precision lighting instruments, but they tend to be large, complex and expensive. Framing projectors have no means for eliminating UV and IR, so the projected light beams contain substantial amounts of invisible energy that produce photochemical damage.

PURPOSE OF THE PRESENT INVENTION

The primary purpose of the present invention is to provide luminaires (lighting fixtures) having the zero UV and zero IR properties of the fiber optic systems shown in the applicants' fiber optic '399 patent, and additionally having the ability to control beam size, shape and color like high-quality framing projectors. That combination as described herein and illustrated in the drawings, provides a family of hybrid fiber optic framing projectors in various mounting configurations that are ideal for illumination of sensitive materials in museums, residences and retail displays.

DETAILED DESCRIPTION OF THE PREFERRED EMBODIMENTS

Figure 1:
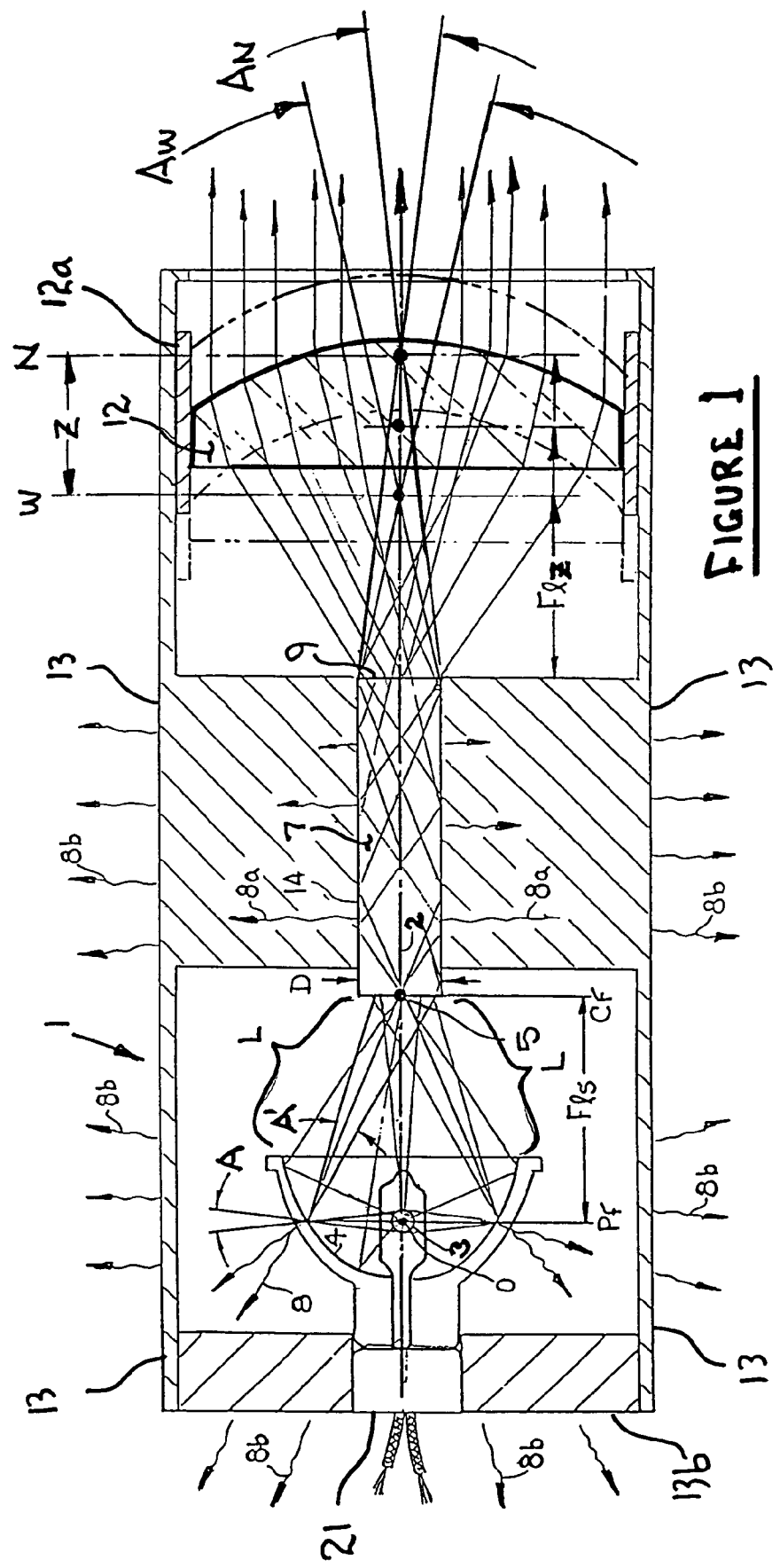
FIG. 1 is a simplified optical diagram of a longitudinal cross-section of a first embodiment of a hybrid fiber optic framing projector according to the present invention.

FIG. 1 is a simplified optical diagram of a longitudinal cross-section of a first embodiment of a hybrid fiber optic framing projector 1 (hereinafter referred to as a "projector") according to the present invention. The projector has a light source 3 on the proximal end of an optical axis 2 at primary focus 0 of a dichroic "cold mirror" ellipsoidal reflector 4 in a primary focal plane Pf. Reflector 4 transmits a portion of the lamp IR 8 and reflects the rest with visible light to a conjugate focus 5 in conjugate focal plane Cf spaced in the distal direction on the optical axis a source focal length Fls. Conjugate focus 5 is at the proximal end of a UV and IR absorbing glass rod 7 that functions as an optical fiber, capturing and transmitting light by total internal reflection to a distal end 9.

Focal plane Pf at light source 3 contains the greatest amount of light, as it is the plane of the peak zonal constant. Angle A, the angle subtended by light source 3, is reflected from reflector 4 as angle A', establishing the diameter of glass rod 7 for the most efficient light collection. The length of glass rod 7 is established by a number of internal reflections within the rod to homogenize the light so the luminance across distal end 9 is smooth and uniform. This length has been found to be approximately 5 times the rod diameter as shown in the drawings. The luminous distal end 9 of glass rod 7 illuminates collimating lens 12 at its optical center at Flz a zoom focal length in the distal direction from glass rod end 9. Collimating lens 12 may be moved over zoom range Z on optical axis 2 from a wide floodlight beam position W (producing beam angle AW) to a narrow spotlight beam position N (producing beam angle AN). Although the embodiment shown has a zoom range Z, it is obvious that lens 12, in a lens holder 12a, may have a fixed position at W to provide a wide beam floodlight, or may have a fixed position at N to provide a narrow beam spotlight, or have any beam width therebetween. The glass rod, functioning as an optical fiber, has a total internal reflection (Brewster's angle) producing an emitted beam-width of approximately 75°. This requires a lens aperture (focal length to diameter ratio) of approximately f:1 as shown for optimum light capture.

The goal of "no UV or IR" is also achieved by this preferred embodiment through optimum thermal design. It is well known that typical tungsten/halogen lamps produce only about 5% visible light. About 1% of the energy in invisible UV, and the 94% balance of the lamp energy is IR heat. It is known in the museum lighting industry that approximately half of photochemical damage is caused by the 1% UV, and the other half is caused by the 94% IR. This is also true of high-intensity discharge lamps, such as metal halide lamps, in which there is approximately 3% UV and 75% IR. Thus both forms of invisible radiation must be eliminated in any luminaires used for either museum or quality retail merchandise illumination.

The UV is nearly all absorbed in the present invention by the elongated glass rod, and the small remainder is absorbed by the lens, which is preferably made of transparent plastic, such as polymethyl methacrylate or polycarbonate, both excellent UV absorbers.

The IR is eliminated by the present invention in stages. First, lamp 1 is disposed within a "cold mirror" reflector 4, that transmits about 30% of IR radiation 8 out to a heat conductive housing 13 producing external IR radiation 8b. Then about 60% of lamp IR is focussed at conjugate focus 5 on the proximal end of glass rod 7. The glass rod 7 absorbs the IR and transfers it by conduction through a thermal bond interface 14 and conduction path 8a to exterior housing surfaces to be dissipated as radiation 8a from housing 13. This system is so effective the distal end of the glass rod is cool to the touch.

Although the first preferred embodiment of the invention is simple and relatively inexpensive, as shown in FIG. 1 the light falling within the brackets marked L is lost as visible light, absorbed and converted into heat.

Figure 2:
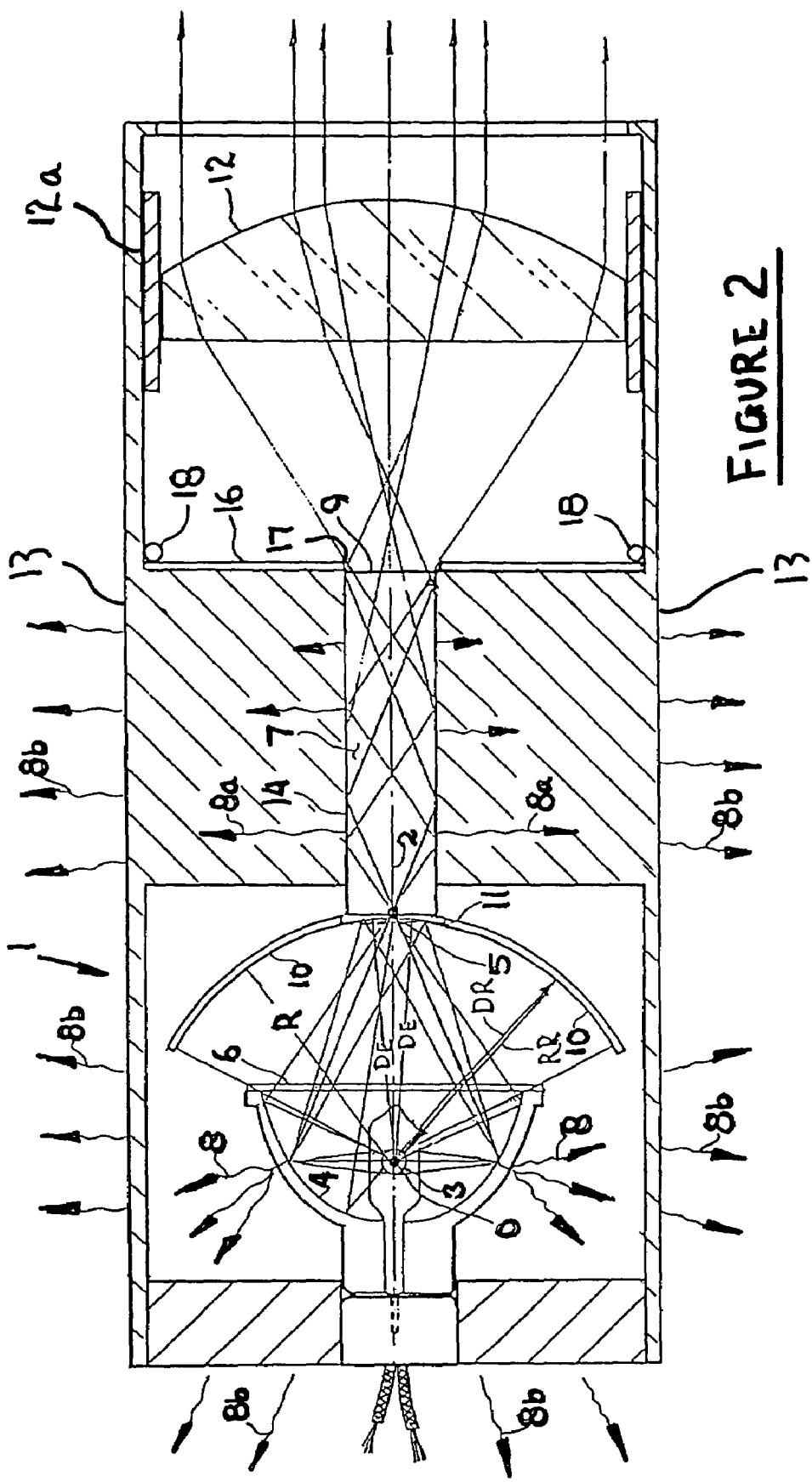
FIG. 2 is a simplified optical diagram of a longitudinal cross-section of a second embodiment of a hybrid fiber optic framing projector according to the present invention.

In FIG. 2 a simplified optical diagram of a longitudinal cross-section of the second preferred embodiment of the present invention is shown, in which the lost light L (as illustrated in FIG. 1) is collected by a confocal reflector 10 having a spherical radius R about light source 1 at primary focus 3.

Confocal reflector 10 has a hole 11 on optical axis 2 on which glass rod 7 and hot mirror 6 are located. Direct emitted rays DE will travel in the distal direction from light source 3 through hot mirror 6 to glass rod 7. The thermal management of this embodiment is substantially identical to that of the first embodiment of FIG. 1.

Direct rays DR from light source 3 striking confocal reflector 10 will be reflected back onto or past light source 3 as reflected rays RR. Reflected rays RR striking light source 3 can either be reflected or absorbed and re-radiated. RR rays that pass through or near light source 3 are reflected from reflector 4. Those rays will then to travel to conjugate focus 5 as additional light energy.

A aperture plate 16 having one or more apertures 17 is positionable at the distal end 9 of glass rod 7 and held thereat by fasteners 18 or friction. Aperture(s) 17 may vary in optical properties of size, shape or color, forming an image plane at the focus Flz of lens 12, whereby collimating lens 12 will project a beam having the optical properties of the aperture.

Figure 3:
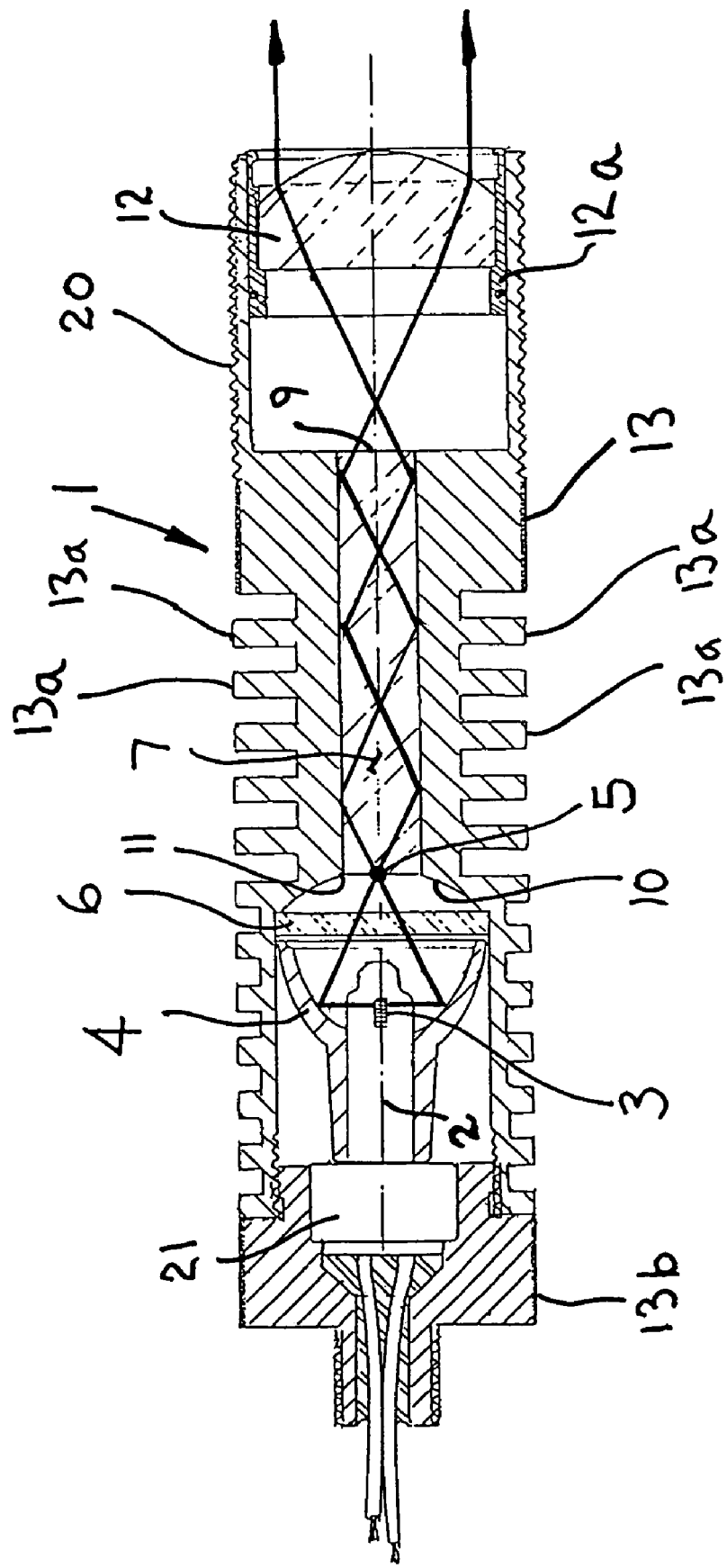
FIG. 3 is a cross-section view of a third embodiment of a hybrid fiber optic framing projector according to the present invention.

In FIG. 3 the third preferred embodiment of the invention is shown, in which the components in the first and second embodiments are illustrated with preferred part proportions. It will be apparent to one skilled in the art that the principles are applicable to luminaires of virtually any size.

In FIG. 3 confocal reflector 10 is integral with housing 13, and glass rod 7 is bonded to housing 13. Similarly, lamp 1 within reflector 4 is held in lampholder 21 which is thermally bonded into cap 13b of housing 13 that is removable for re-lamping. Confocal reflector 10 has a hole 11 on optical axis 2 on which hot mirror 6 and glass rod 8 are located. Light emitted from light source 3 is focussed by reflector 4 through hot mirror 6 to conjugate focus 5 and enters glass rod 7. Light passing through glass rod 7 is homogenized by multiple internal reflections as its heat is conducted to radiating fins 13a on housing 13. At distal end 9 of glass rod 7 the light is substantially de-focussed to uniformly illuminate distal end 9. Thus an image of distal end 9 is collected and collimated by lens 12. Lens 12 is axially adjustable as shown in the optical diagram of FIG. 1, so the beam in the embodiment of FIG. 3 may be similarly zoomed to any preferred beam diameter.

Although glass rod 7 is considered an excellent absorber of both UV (light wavelengths shorter than 380 nanometers) and IR (light wavelengths longer than 770 nanometers), those boundaries are indistinct a very small amount of such invisible radiations will leak through the glass. Thus the lens is at least ⅜-inch thick, sufficient to bring the UV and IR down to zero, which is desired for illuminating very fragile artifacts, such as old documents or textiles.

Housing 13 is provided at its distal end with mounting threads 20 adapted to several mounting systems as described below.

Figure 4:
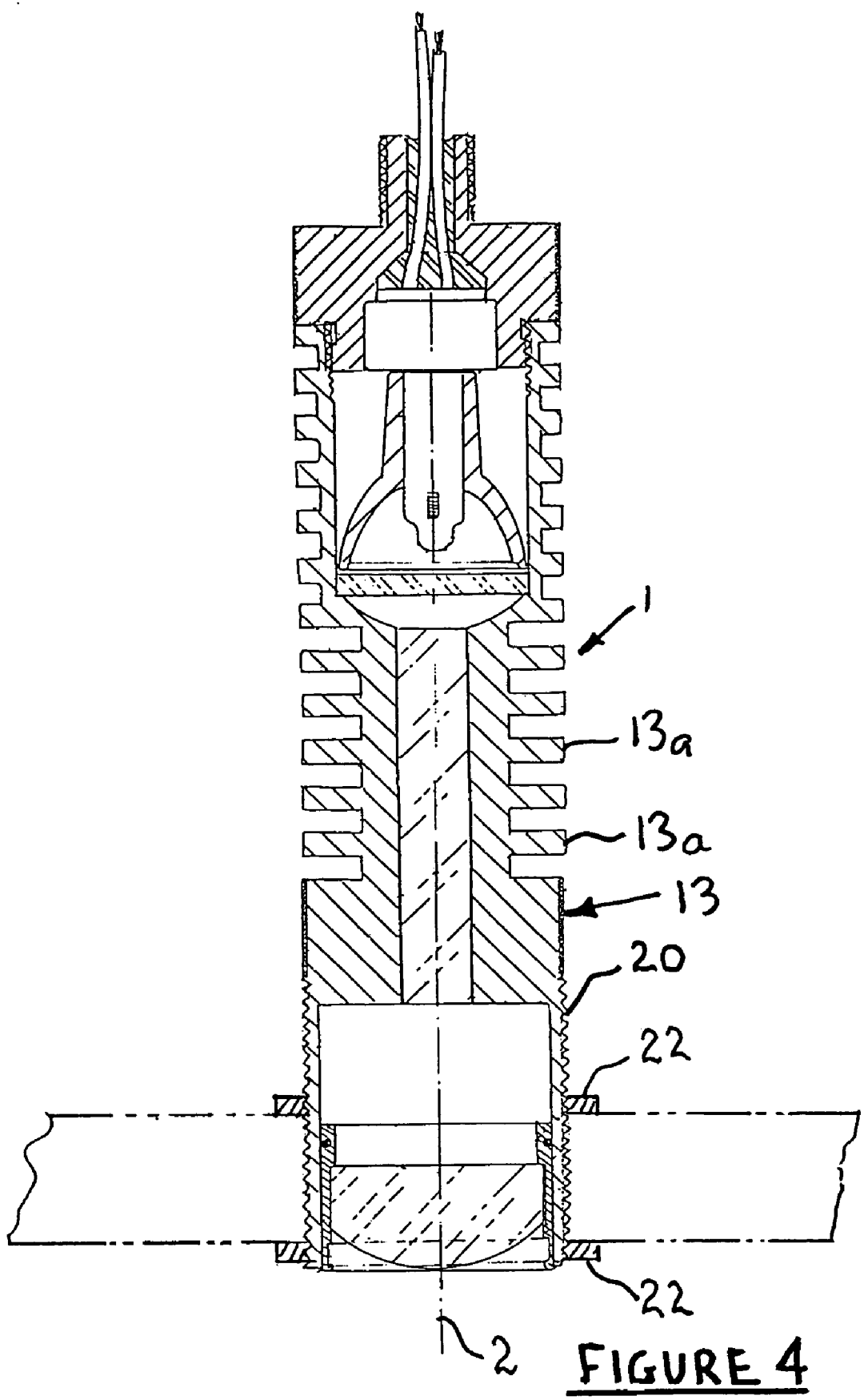
FIG. 4 is a cross-section view of a hybrid fiber optic framing projector shown in a recessed ceiling mount configuration.

In FIG. 4 mounting threads 20 on housing 13 are engaged into internally-threaded mounting rings 22 that are shown supporting the luminaire in a hole through a ceiling.

Figure 5:
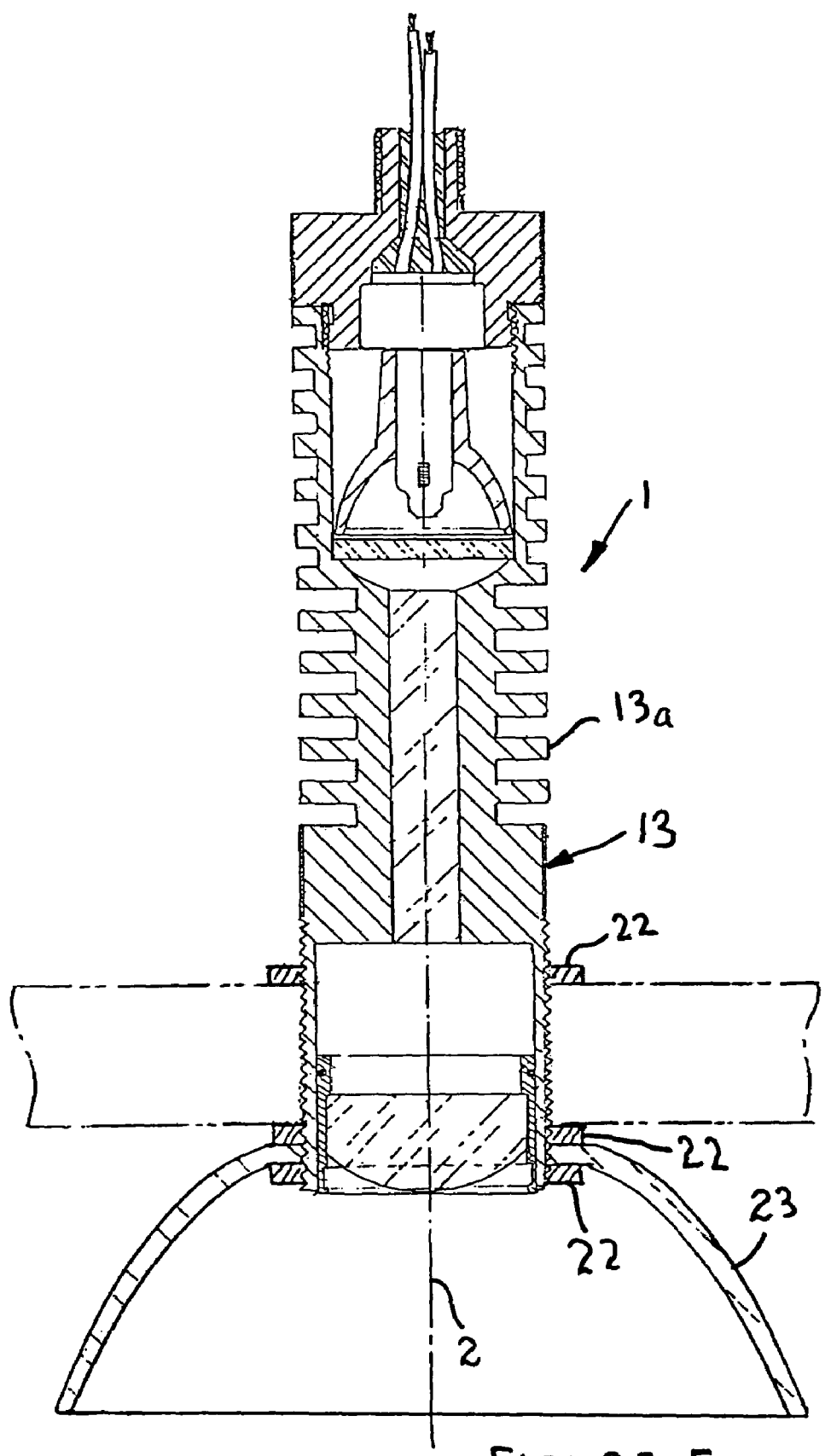
FIG. 5 is a hybrid fiber optic framing projector according to the present invention shown in a recessed ceiling mount configuration with a depending decorative shade.

In FIG. 5 mounting threads 20 on housing 13 are engaged into internally-threaded mounting rings 22 that are shown supporting the luminaire in a hole through a ceiling and also holding a shade 23 on optical axis 2. The shade may be transparent, translucent or opaque.

Figure 6:
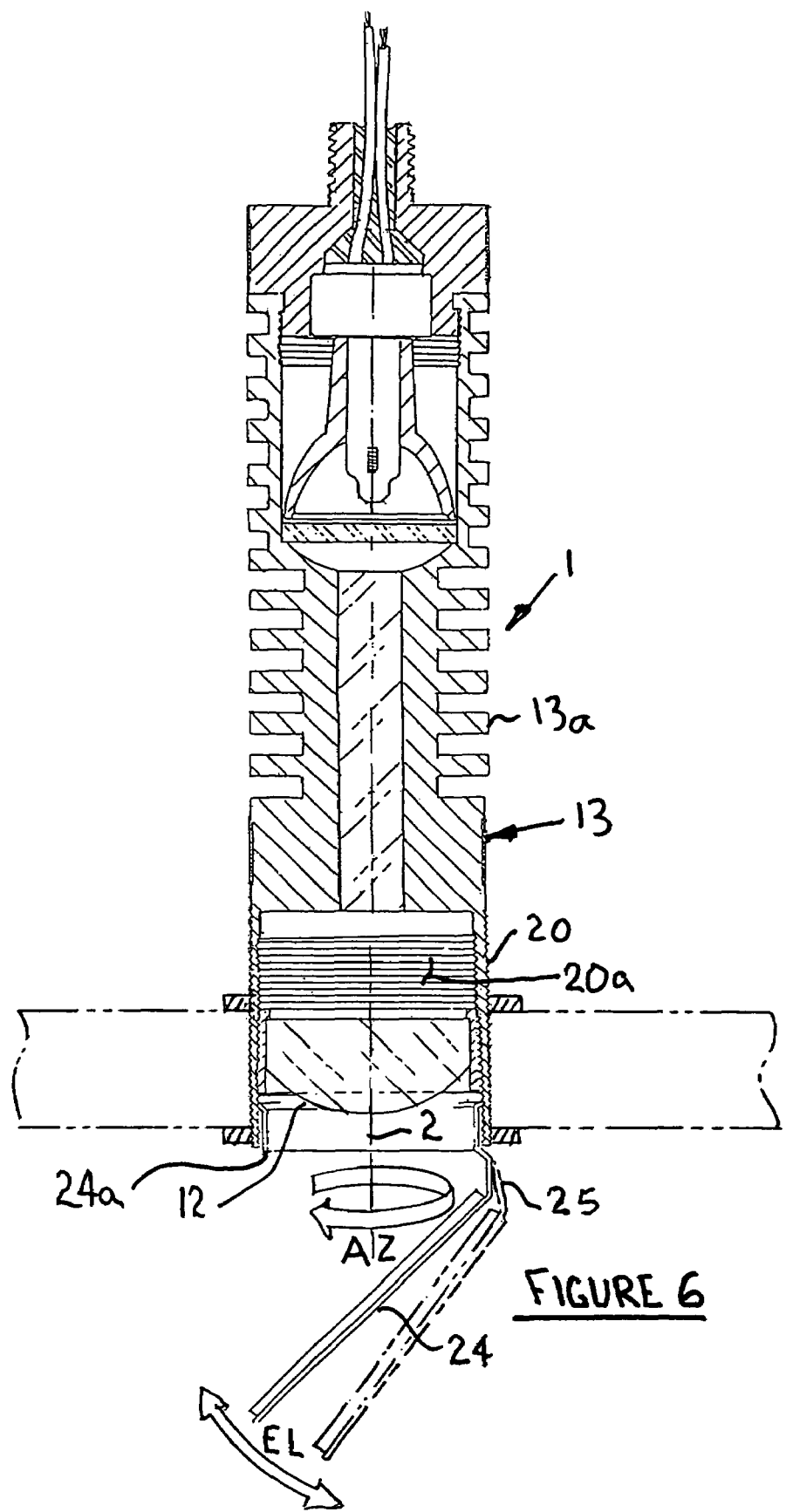
FIG. 6 is a hybrid fiber optic framing projector according to the present invention shown in a recessed ceiling mount configuration with a depending azimuth-elevation aiming mirror.

In FIG. 6 mounting threads 20 on housing 13 are engaged into internally-threaded mounting rings 22 that are shown supporting the luminaire in a hole through a ceiling. Internal threads 20a may also be provided in housing 13 whereby lens 12 may be externally threaded and rotated in threads 20a to provide axial movement for zooming the beam. Then an azimuth-elevation mirror 24 may be engaged into internal threads 20a or onto external threads 20, to be rotated on mounting ring 24a in azimuth AZ about optical axis 2, and/or aimed in elevation EL by bending mounting arm 25.

Figure 7:
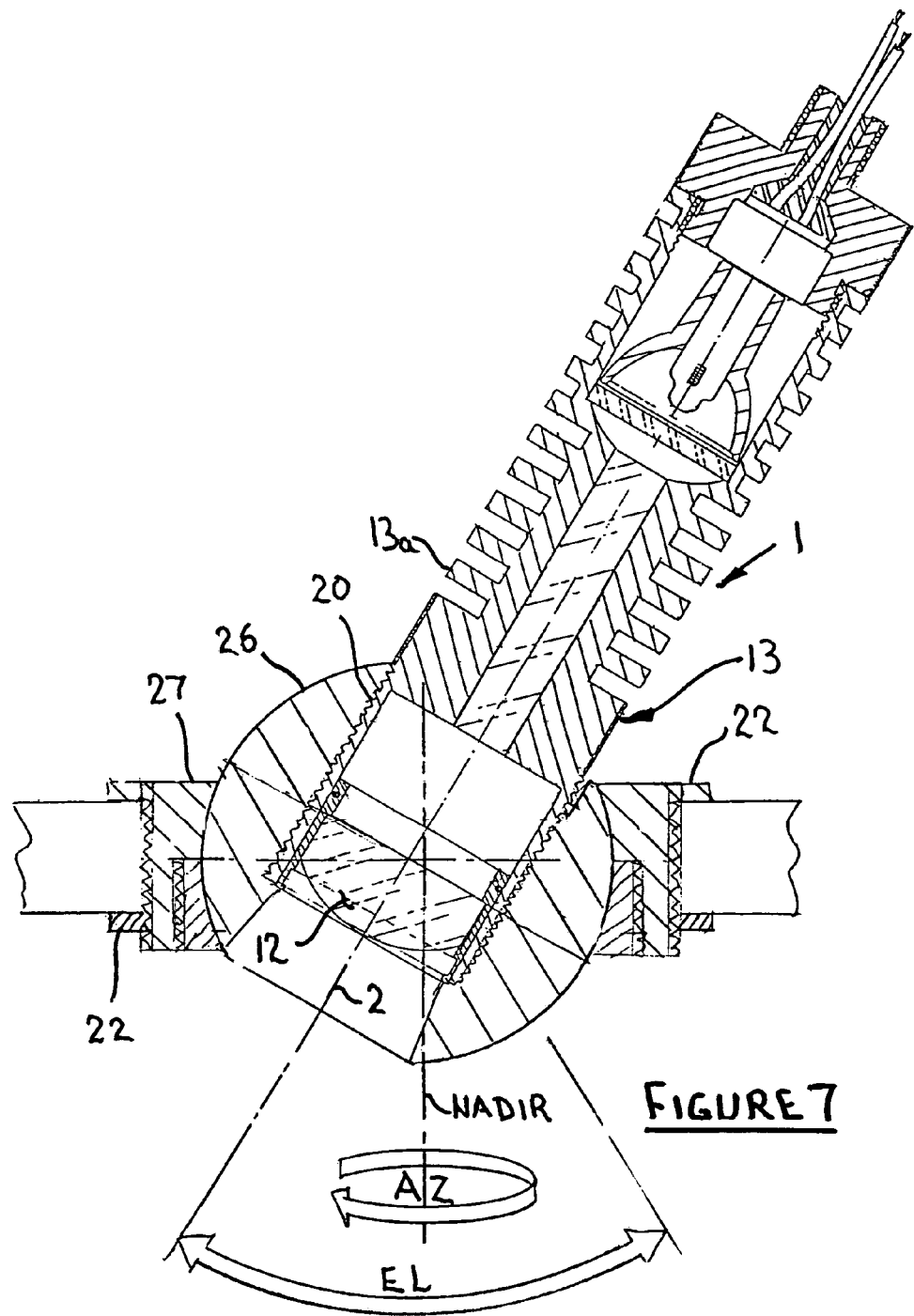
FIG. 7 is a hybrid fiber optic framing projector according to the present invention shown in a recessed ceiling mount configuration including an eyeball.

In FIG. 7 mounting threads 20 on housing 13 are engaged into an internally-threaded mounting eyeball 26 within a eyeball socket bushing 27 in turn, mounts with mounting rings 22 to support the luminaire in a hole through a ceiling. The luminaire housing 13 can thus be aimed in AZ and elevation EL directions about a nadir axis, and lens 12 may still be zoomed in beam size.

Figure 8:
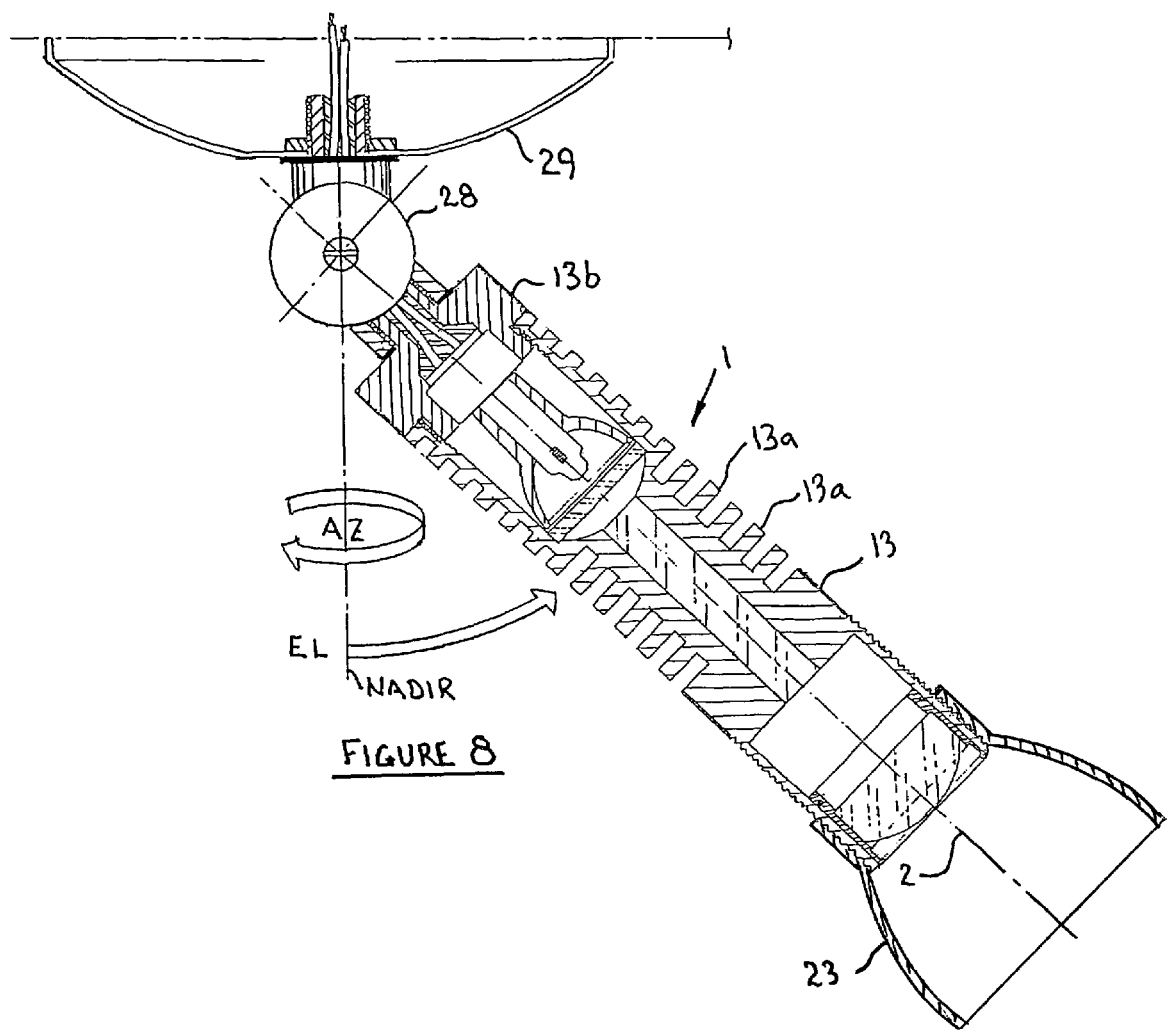
FIG. 8 is a cross-section view of a hybrid fiber optic framing projector according to the present invention shown in an aimable swivel canopy ceiling mount configuration.

In FIG. 8 the proximal end of housing 13 is shown engaged into a swivel fitting 28 that supports housing 13 on a ceiling canopy 29, permitting the optical axis 2 of the luminaire to be aimed in azimuth AZ and elevation EL through angles from horizontal through nadir. Obviously, canopy 29 may be mounted on other than a ceiling surface, whereby nadir would not be vertical, but would be perpendicular to the mounting surface.

Figure 9:
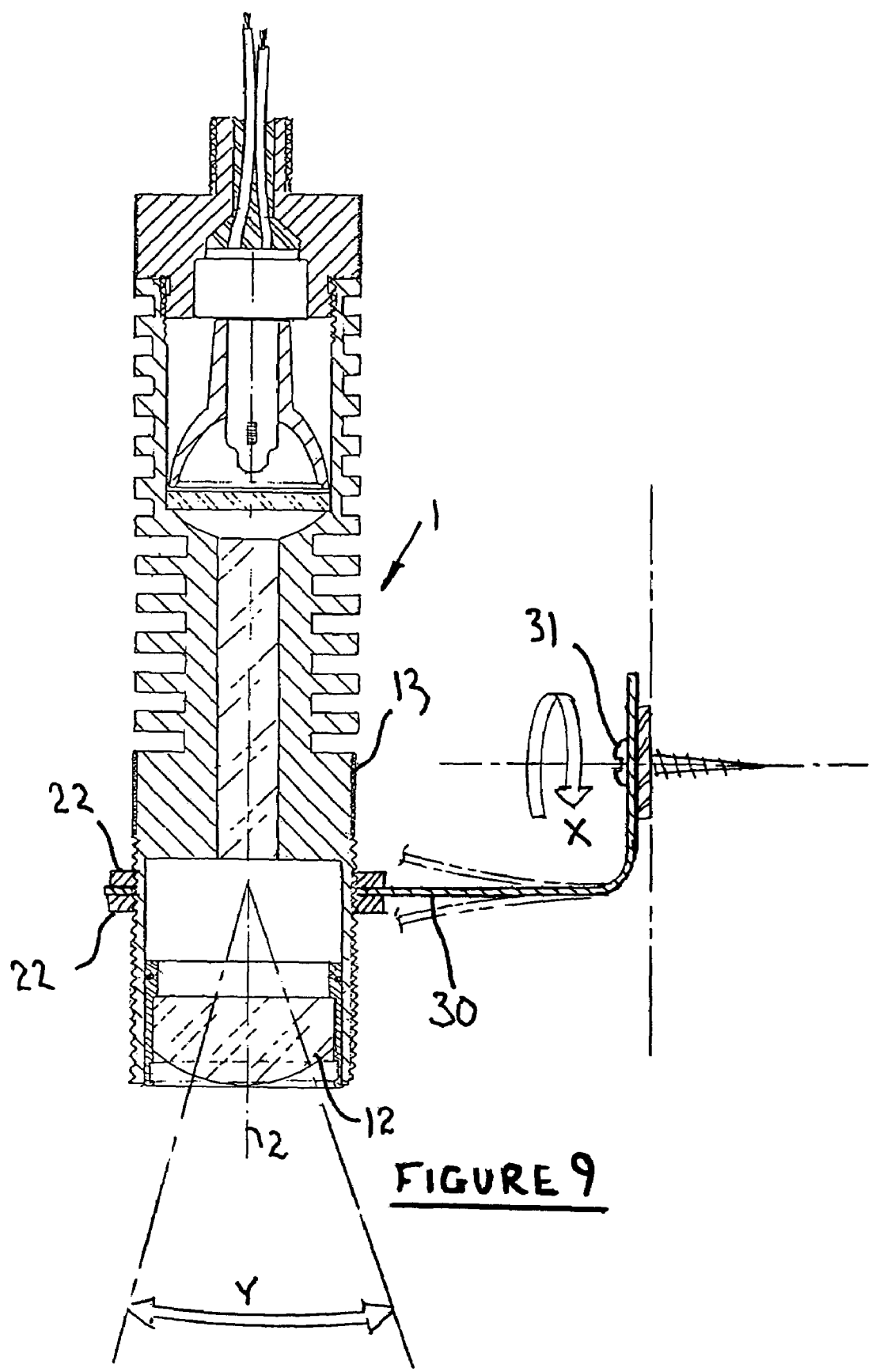
FIG. 9 is a cross-section view of a hybrid fiber optic framing projector according to the present invention shown in an aimable bracket mount configuration.

In FIG. 9 mounting threads 20 on housing 13 are engaged into internally-threaded mounting rings 22 that are shown supporting the luminaire on a bendable bracket 30, bendable about axis Y, and which can be rotated about a mounting point 31 about axis X.

SUMMARY

Although both fiber optic projectors and framing projectors are well known, the combination of the two fields into a hybrid fiber optic framing projector is absent in the prior art. Thus the present invention has produced a family of unique luminaires with unique properties, including improved optical efficiency, total absence of inrfrared and ultraviolet radiation, precise beam control, exceellent thermal management and a universal mounting capability.

The invention claimed is:

1. A hybrid fiber optic framing projector (1) including:
   a light source (3) on the proximal end of an optical axis (2), energized from a remote source of electrical power;
   an ellipsoidal reflector (4) coaxial with optical axis (2) having a primary focus (0) at light source (3) and a conjugate focus (5) at an image plane spaced on the optical axis in the distal direction;
   an elongated, transparent glass rod (7) coaxial with optical axis (2), having a proximal end at conjugate focus (5) and a distal end (9);
   a collimating lens (12) coaxial with optical axis (2) and spaced in the distal direction a distance from the distal end of the glass rod approximately equal to the lens focal length (Fl); and
   a housing (13) enclosing light source (3), ellipsoidal reflector (4), glass rod (7) and lens (12).

2. A hybrid fiber optic framing projector (1) including:
   a light source (3) on the proximal end of an optical axis (2), energized from a remote source of electrical power;
   an ellipsoidal reflector (4) coaxial with optical axis (2) having a primary focus (0) at light source (3) and a conjugate focus (5) at an image plane spaced on the optical axis in the distal direction;
   an elongated, transparent glass rod (7) coaxial with optical axis (2), having a proximal end at conjugate focus (5) and a distal end (9);
   a collimating lens (12) coaxial with optical axis (2) and spaced in the distal direction a distance from the distal end of the glass rod approximately equal to the lens focal length (Fl);
   a spherical confocal reflector (10) coaxial with the optical axis (2), having a confocal radius of curvature about the light source (3), said radius having a length equal to the distance from the primary focus (0) to the conjugate focus (5), said confocal reflector having a hole (11) therethrough at the conjugate focus (5) encompassing the proximal end of the glass rod (7)
   a housing (13) enclosing light source (3), ellipsoidal reflector (4), glass rod (7) and lens (12).

3. A hybrid fiber optic framing projector (1) according to claim 1 in which ellipsoidal reflector (4) is a dichroic cold mirror substantially reflecting visible light and transmitting IR heat to a portion of the housing (13), and in which glass rod (7) is in thermal contact with another portion of housing (13).

4. A hybrid fiber optic framing projector (1) according to claim 1 in which an aperture plate (16) has one or more apertures (17) at the distal end (9) of glass rod (7), said apertures having variable in optical properties.

5. A hybrid fiber optic framing projector (1) including:
   a light source (3) on the proximal end of an optical axis (2), energized from a remote source of electrical power;
   an ellipsoidal reflector (4) coaxial with optical axis (2) having a primary focus (0) at light source (3) and a conjugate focus (5) at an image plane spaced on the optical axis in the distal direction;
   an elongated, transparent glass rod (7) coaxial with optical axis (2), having a proximal end at conjugate focus (5) and a distal end (9);
   a collimating lens (12) coaxial with optical axis (2) and spaced in the distal direction a distance from the distal end of the glass rod approximately equal to the lens focal length (Fl);
   a lens mount holding collimating lens (12), whereby said lens is axially movable to change focal length and beam width, and
   a housing (13) enclosing light source (3), ellipsoidal reflector (4), glass rod (7) and lens (12).

6. A hybrid fiber optic framing projector (1) according to claim 1 in which the distal end of the housing (13) has external threads (20).

7. A hybrid fiber optic framing projector according to claim 1 in which the distal end of the housing (13) has internal threads (20a).

8. A hybrid fiber optic framing projector (1) according to claim 1 in which the distal end of the housing (13) has external threads (20) and a plurality of mating, internally-threaded rings (22).

9. A hybrid fiber optic framing projector (1) according to claim 1 in which the distal end of the housing (13) has internal threads (20*a*) and the lens (12) has mating external threads for axial movement on the optical axis (2.).

10. A hybrid fiber optic framing projector (1) according to claim 1 in which the distal end of the housing (13) includes an azimuth-elevation aiming mirror (24) having a bendable arm (25) and a resilient ring (24*a*) engaging the distal end of the housing (13).

11. A hybrid fiber optic framing projector (1) according to claim 1 in which the distal end of the housing (13) has mounting threads (20) engaged into an eyeball (26) in a ball socket bushing (27) having mounting rings (22) supporting ball the socket bushing (27) in a hole through a ceiling.

12. A hybrid fiber optic framing projector (1) according to claim 1 in which the proximal end of the housing (13) is mounted onto a swivel (28) that is supported on a mounting canopy (29) attachable to any planar structure.

13. A hybrid fiber optic framing projector (1) according to claim 1 in which the distal end of the housing (13) is engaged into a pivotal, bendable angle bracket (30) and held therein by internally threaded rings (22).

14. A hybrid fiber optic framing projector (1) according to claim 1 in which the housing (13) is made of a heat conductive material and at least a portion of its outer surface comprises one or more cooling fins (13*a*).

15. A hybrid fiber optic framing projector (1) according to claim 1 in which the proximal end of the housing (13) has a lampholder (21) thermally attached to a proximal end cap (13*b*) that is removable from the housing (13) for replacing the light source (3).

16. A hybrid fiber optic framing projector (1) according to claim 1 in which the glass rod (7) is at least 5 times longer than its diameter and the collimating lens is plastic at least ⅜-inch thick.

\* \* \* \* \*